(12) United States Patent
Kanathu et al.

(10) Patent No.: US 12,351,321 B2
(45) Date of Patent: Jul. 8, 2025

(54) SYSTEM AND METHOD FOR DETECTING ICE ACCRETION ON A ROTOR OF AN AIRCRAFT

(71) Applicant: HONEYWELL INTERNATIONAL INC., Charlotte, NC (US)

(72) Inventors: Mohan Kanathu, Bangalore (IN); Sivaprakash Pasupathi, Bangalore (IN); Ondrej Karas, Brno (CZ)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 177 days.

(21) Appl. No.: 18/191,579

(22) Filed: Mar. 28, 2023

(65) Prior Publication Data

US 2024/0262512 A1    Aug. 8, 2024

(30) Foreign Application Priority Data

Feb. 7, 2023   (IN) .............................. 202311007825

(51) Int. Cl.
*G08B 21/00* (2006.01)
*B64D 15/20* (2006.01)

(52) U.S. Cl.
CPC .................................. *B64D 15/20* (2013.01)

(58) Field of Classification Search
CPC ........ B64D 15/20; B64D 15/22; B64D 15/00; B64D 45/00; B64D 31/06; B64C 27/04; B64C 29/00; F02C 9/00; G01L 5/133; F05D 2220/329; F05D 2220/90
USPC ..................... 340/962, 945, 580, 963; 701/14
See application file for complete search history.

(56) References Cited

U.S. PATENT DOCUMENTS

| | | | |
|---|---|---|---|
| 6,304,194 B1 | 10/2001 | McKillip | |
| 7,564,373 B2 | 7/2009 | Platt | |
| 7,837,149 B2 | 11/2010 | Mackin | |
| 8,462,354 B2 | 6/2013 | Barnes | |
| 9,957,053 B2 | 5/2018 | Almond | |
| 2008/0128556 A1* | 6/2008 | Platt ....................... | B64D 15/20 244/134 F |
| 2012/0085868 A1* | 4/2012 | Barnes .................... | B64D 15/20 244/134 F |
| 2014/0379177 A1 | 12/2014 | Takasaki | |
| 2016/0035203 A1* | 2/2016 | Rossotto ................ | G08B 19/02 701/36 |
| 2020/0378856 A1* | 12/2020 | Warlick ................ | G01L 27/007 |
| 2022/0402596 A1 | 12/2022 | Karas | |

FOREIGN PATENT DOCUMENTS

| | | |
|---|---|---|
| CN | 100509559 C | 7/2009 |
| FR | 2681310 A | 3/1993 |
| GB | 2046690 A | 12/1982 |
| JP | 2001253394 A | 9/2001 |

* cited by examiner

*Primary Examiner* — Anh V La
(74) *Attorney, Agent, or Firm* — Lorenz & Kopf, LLP

(57) ABSTRACT

A system for detecting ice accretion on a rotor of an aircraft includes a processing system that is configured to: receive torque data indicative of actual torque supplied from an electric motor to the rotor; implement a model of the electric motor and the rotor that determines an estimated torque that should be supplied from the electric motor to the rotor; compute a load on the rotor from the actual torque and the estimated torque; compare the computed load to a predetermined magnitude; and when the computed load exceeds the predetermined magnitude, generate an alert that indicates ice is accreting on the rotor.

18 Claims, 4 Drawing Sheets

SYSTEM AND METHOD FOR DETECTING ICE ACCRETION ON A ROTOR OF AN AIRCRAFT

CROSS REFERENCE TO RELATED APPLICATION

The present application claims benefit of prior filed India Provisional Patent Application Ser. No. 202311007825, filed Feb. 7, 2023, which is hereby incorporated by reference herein in its entirety.

TECHNICAL FIELD

The present disclosure relates to aircraft ice accretion, and more particularly to a system and method for detecting ice accretion on a rotor of an aircraft.

BACKGROUND

The market for Urban Air Mobility (UAM) and Unmanned Aerial Vehicle (UAV) aircraft is emerging and is seen as the future of aviation for both personnel transport over short distances (e.g., air taxis), search and rescue operations, aerial inspections, and transport and delivery of various supplies, just to name a few. The UAM/UAV aircraft are designed to be relatively small in size. Generally, the impact of weather hazards on aircraft increases as the size of the aircraft decreases. As such, it is expected that UAM/UAV aircraft will likely be more susceptible to weather hazard impact. Various weather hazards can impact UAM/UAV aircraft operations. One such weather hazard is ice accretion; more specifically, ice accretion (or "icing") on the aircraft rotor blades, which can occur, for example, while flying into clouds, rain, and/or snow conditions.

There are many systems and methods available on the market that detect icing and, upon detecting icing, activate a deicing system. However, in the context of UAM/UAV aircraft, energy is a key factor, and having an ice detection and deicing system will increase the electric energy consumption, cost, and weight, and thus reduce the range of the UAM/UAV aircraft. This is especially true since presently conceived UAM/UAV aircraft will have multiple rotors and control surfaces. Moreover, some UAM/UAV aircraft that are designed as vertical take-off and landing (VTOL) aircraft, will have multiple rotors that in a stowed position during the cruise phase of flight, which can potentially increase ice accretion and potentially degrade rotor operation, thereby adversely impacting aircraft operability during the transition or vertical landing phases of aircraft.

Hence, there is a need for a system and method to detect ice accretion on aircraft rotors, and most notably on UAM/UAV aircraft rotors, to thereby enable suitable deicing operations or provide crew indications of icing and do so with negligible or no increase in electric energy consumption, cost, and weight. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for detecting ice accretion on a rotor of an aircraft includes a processing system that is configured to: receive torque data indicative of actual torque supplied from an electric motor to the rotor; implement a model of the electric motor and the rotor that determines an estimated torque that should be supplied from the electric motor to the rotor; compute a load on the rotor from the actual torque and the estimated torque; compare the computed load to a predetermined magnitude; and when the computed load exceeds the predetermined magnitude, generate an alert that indicates ice is accreting on the rotor.

In another embodiment, a method for detecting ice accretion on a rotor of an aircraft includes calculating, in a processor, actual torque supplied from an electric motor to the rotor. The torque that should be supplied from the electric motor to the rotor is estimated using a model of the electric motor and the rotor. The load on the rotor is computed from the actual torque and the estimated torque. The computed load is compared to a predetermined magnitude in the processor and, when the computed load exceeds the predetermined magnitude, an alert is generated that indicates ice is accreting on the rotor.

In yet another embodiment, an aircraft includes a fuselage, a plurality of rotors, a plurality of motors, and an ice accretion detection system. The rotors are disposed on the fuselage and each is coupled to receive a drive torque. Each motor is coupled to, and is configured to supply the drive torque to, a different one of the rotors. The ice accretion detection system includes a processing system that is configured to: receive torque data indicative of actual torque supplied from each electric motor to its associated rotor; implement models of each electric motor and rotor combination, wherein each model determines an estimated torque that should be supplied from each electric motor to its associated rotor; compute a load on each rotor from the actual torque and the estimated torque; compare each of the computed loads to a predetermined magnitude; and when one or more of the computed loads exceeds the predetermined magnitude, generate an alert that indicates ice is accreting on the associated rotor.

Furthermore, other desirable features and characteristics of the ice accretion detection system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
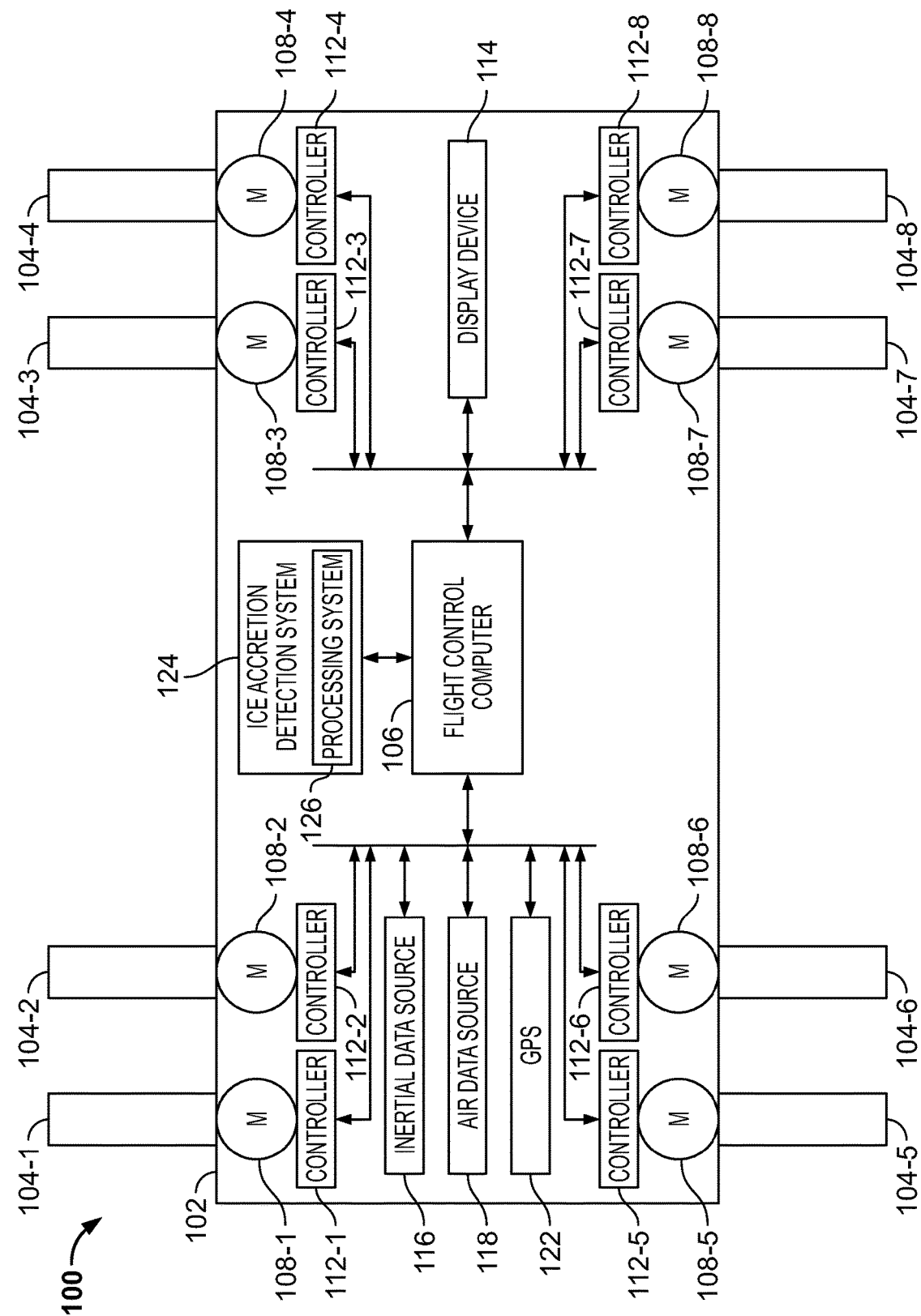
FIG. 1 depicts a functional block diagram of an aircraft that includes a flight control computer and an ice accretion detection system.

Referring first to FIG. 1, a functional block diagram of an aircraft 100 is depicted. The aircraft 100, which in the depicted embodiment is configured as an electric Vertical Take-off and Landing (eVTOL) aircraft, includes at least a fuselage 102, a plurality of rotors (or propellers) 104 (e.g., 104-1, 104-2, 104-3, . . . 104-8), and a flight control computer 106, which may in some embodiments, be referred to, or implemented as part of, a vehicle management system. Before proceeding further, it should be noted that the aircraft 100 could also, in other embodiments, be configured as other than an eVTOL aircraft. Moreover, while the depicted aircraft 100 is also preferably configured as a UAM or UAV type of aircraft, it could be configured as other types of aircraft.

No matter the specific type and configuration of the aircraft, the rotors 104 are each disposed on the fuselage 102 and are each coupled to receive a drive torque. The rotors 104, upon receipt of the drive torque, rotate and, as is generally known, generate and supply a thrust to the fuselage 102. Although the depicted embodiment includes eight rotors 104, it will be appreciated that in other embodiments the aircraft 100 could be implemented with more or less than this number of rotors 104.

As FIG. 1 also depicts, the aircraft 100 additionally includes a plurality of electric motors 108 (e.g., 108-1, 108-2, 108-3, . . . 108-8) and a plurality of motor controllers 112 (e.g., 112-1, 112-2, 112-3, . . . 112-8). Specifically, the aircraft 100 includes one electric motor 108 for each of the rotors 104 and one motor controller 112 for each of the electric motors 108. Each electric motor 108 is coupled to, and is configured to supply the drive torque to, a different one of the rotors 104. It will be appreciated that the electric motors 108 may be implemented using any one of numerous known AC or DC motor configurations. In the depicted embodiment, however, each motor 108 is configured as a brushless DC (BLDC) motor.

The speed at which each electric motor 108 rotates, and thus the torque it supplies to its associated rotor 104, is controlled by one of the motor controllers 112. In this regard, each motor controller 112 is in operable communication with a different one of the electric motors 108. Each motor controller 112 is also coupled to receive RPM command data from, for example, the vehicle management system 106. The RPM command data is indicative of the desired rotational speed of the electric motor 108, which corresponds to a desired rotational speed (e.g., RPM) of the associated rotor 104. Each motor controller 112 is configured, upon receipt of the RPM command data, to command its associated electric motor 108 to rotate at the commanded RPM. As will be discussed further below, the motor controller may also be configured to supply the RPM command data to the processing system The flight control computer 106 is configured, among various other functions, to control the overall operation of the aircraft 100 through all phases of flight—either wholly autonomously (UAV) or via an onboard or remote operator (UAM)—and commands one or more display devices 114 (only one shown) to render various images. In either case, to implement its functionality the vehicle management system 106 receives data from various data sources and, in response to these data, controls the speed and direction of the aircraft 100. Although the number and type of data sources may vary, in the depicted embodiment these data sources include at least an inertial data source 116, an air data source 118, and a global positioning system (GPS) 122, just to name a few. It will be appreciated that the aircraft 100 may and likely would, include additional data sources that supply various other types of data to the flight control computer 106. These other data sources are not needed to implement the invention defined by the claims. As such, these other data sources are neither depicted nor further described herein.

The inertial data source 116, as is generally known, is configured to supply various types of inertial data. The inertial data may vary, but it includes at least angular rate data and body axis acceleration data. The angular rate data is indicative of the angular rates (i.e., roll rate (p), pitch rate (q), and yaw rate (r)) of the aircraft 100. The body axis acceleration data is indicative of the acceleration (A) of the aircraft 100 in three orthogonal axes (i.e., $A_x$, $A_y$, $A_z$).

The air data source 118, as is also generally known, is configured to supply various types of air data. The air data may vary, but it includes at least air density data, total pressure data, and angle-of-attack data. The air density data is indicative of the air density (rho), the total pressure data is indicative of sensed aircraft total pressure, and the AoA data is indicative of the sensed aircraft AoA.

The GPS 122, as is also generally known, is configured to supply various types of data including, but not limited to, location data indicative of the position/location of the aircraft 100. As will be described further below, the GPS 122 is also configured, at least in the depicted embodiment, to supply ground-based velocity data. As used herein, the ground-based velocity data is indicative of the velocities of the aircraft 100, relative to the ground, in the three orthogonal axes of the North-East-Down (NED) coordinate system.

To control the direction of the aircraft 100, the flight control computer 106 may either directly control the non-illustrated flight control surfaces and/or positions of the rotors 104 (in the case of an eVTOL)), or interface with another, non-illustrated system to control the non-illustrated flight control surfaces and/or positions of the rotors 104. To control the speed of the aircraft 100, the flight control computer 106 controls, for example, the rate at which the rotors 104 rotate. Thus, as alluded to above, the flight control computer 106 is in operable communication with each of the motor controllers 112 and, as was also alluded to above, is configured to the supply RPM command data to each motor controller 112.

As FIG. 1 also depicts, the depicted aircraft 100 additionally includes an ice accretion detection system 124. The ice accretion detection system 124 is configured to detect ice accretion on each of the rotors 104 and includes a processing system 126. As will be discussed further below, the processing system 126 is in operable communication with, and receives data from, the motor controllers 112, the inertial data source 116, the air data source 118, and the GPS 122. Thus, these may also be considered as comprising the ice accretion detection system 124.

The processing system 126 may include one or more processors and computer-readable storage devices or media encoded with programming instructions for configuring the processing system 126. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

Figure 2:
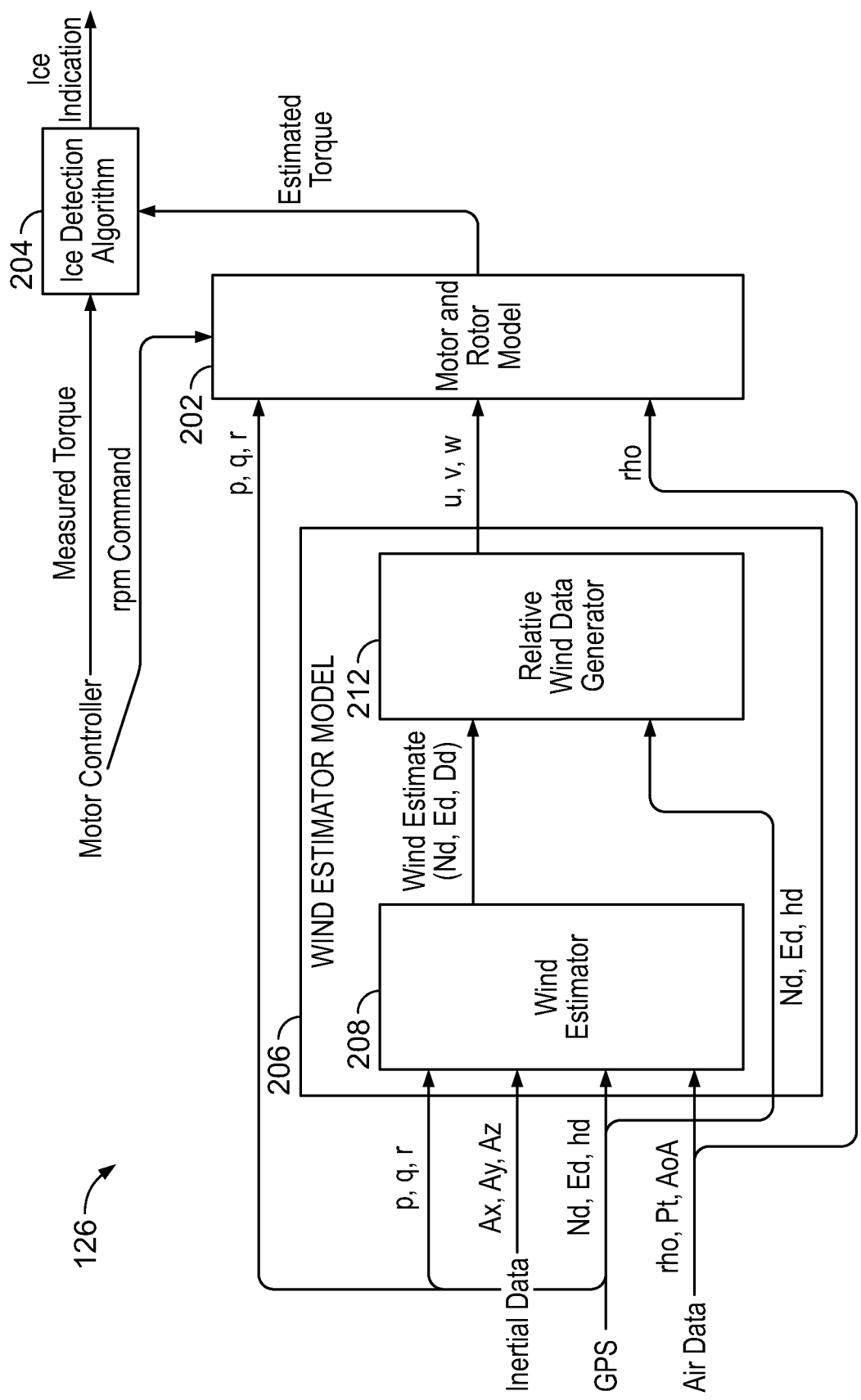
FIG. 2 depicts a functional implementation diagram of a processing system that is used to implement the ice accretion detection system.

Referring now to FIG. 2, it is seen that the processing system 126 is configured to receive torque data indicative of the actual torque supplied from each electric motor 108 to its associated rotor 104. The torque data may be supplied from torque sensors associated with each rotor 104 and/or motor 108. In one particular embodiment, the torque data is supplied from each motor controller 112, which calculates the torque from the current supplied to its associated motor 108. The processing system 126 is also configured to implement a separate motor and rotor model 202 of each electric motor 108 and rotor 104 combination (only one depicted in FIG. 2). Each of these models 202 determines the estimated torque that should be supplied from each electric motor 108 to its associated rotor 104.

The processing system 126 is additionally configured to implement an ice detection algorithm 204, whereby the processing system 126 computes the load on each rotor 104 from the actual torque and the estimated torque. In the depicted embodiment, it does so by computing the difference between the actual and estimated torques. The load on each rotor 104, which is assumed to be due to icing, is then compared to a predetermined magnitude. This predetermined magnitude may vary and may take into consideration, for example, rotor installation, various sensor errors, and system latency. The predetermined magnitude may also be varied, in real-time, based on meteorological data, and more specifically, icing conditions categorized based on the measured liquid water content (LWC), which is expressed in g/m$^3$. In one example embodiment, the predetermined magnitude may varied based on five different categories defined as: (1) No Ice (LWC=0 g/m$^3$), (2) Trace (LWC<0.1 g/m$^3$), (3) Light (LWC=0.11-0.6 g/m$^3$), (4) Moderate (LWC=0.61-1.2 g/m$^3$), and (5) Severe (LWC>1.2 g/m$^3$).

No matter what the specific value of the predetermined magnitude is, when the computed load on one or more rotors 104 exceeds the predetermined magnitude, the processing system 126 will generate an alert that indicates ice is accreting on the one or more rotors 104.

It will be appreciated that the motor and rotor models 202 may determine the estimated torques using various techniques. In the depicted embodiment, however, each model 202 estimates the torque that should be supplied to its associated rotor 104 from: the RPM command data that is supplied from the flight control computer 106, the angular rate data (p, q, r) that is supplied from the inertial data source 116, the air density data (rho) that is supplied from the air data source 118, and from relative wind estimate data (u, v, w) that is supplied from a wind estimator model 206.

The wind estimator model 206 is also implemented in the processing system 126 and will be described momentarily. Before doing so, however, it is noted that although motor and rotor model 202 may be variously implemented, in one particular embodiment each model 202 is implemented using a look-up table specific to each rotor 104, which considers the individual aerodynamics and installation effects, to estimate the torque that should be supplied to its associated rotor 104.

The relative wind estimate data supplied from the wind estimator model 206 to the rotor and motor models 202 is indicative of the estimated relative wind velocities in three orthogonal axes (i.e., u, v, w). To do so, the wind estimator model 206 includes a wind estimator 208 and a relative wind data generator 212. The wind estimator 208 receives the angular rate data (p, q, r), the body axis acceleration data ($A_x$, $A_y$, $A_z$), the total pressure data ($P_t$), the AoA data, and the ground-reference velocity data ($N_d$, $E_d$, $h_d$), and generates ground-reference wind vector data ($N_d$, $E_d$, $D_d$) that is indicative of a ground-referenced wind vector. To do so, the wind estimator 208 includes an onboard aircraft model of the aircraft 100, which generates estimates of the angular rates, body axis accelerations, total pressure, AoA, and ground-reference velocities, and compares these estimates against the measured values. Any differences between the measured and estimated values is attributed to wind. The relative wind data generator 212 converts the ground-reference wind vector ($N_d$, $E_d$, $D_d$) and the ground-reference velocity ($N_d$, $E_d$, $h_d$) to the aircraft body reference system and sums these together to generate the relative wind estimate data (u, v, w).

Returning now to FIG. 1, it was noted that the flight control system 106 includes one or more display devices 114 configured to render various images. At least one of the one or more display devices 114 is in operable communication with the processing system 126, either directly or via the flight control system 106. It will be appreciated that although the display device 114 is depicted as being disposed within the aircraft fuselage 102, in some embodiments it may be disposed at a location that is remote from the aircraft 100.

Regardless of the location of the display device, the processing system 126 is further configured, in at least some embodiments, to command the display device 114 to render a graphic indicator associated with each rotor 104. When the processing system 126 generates an alert indicating ice is accreting on one or more rotors 104, the alert causes the graphic indicator(s) to change color. Although the colors may vary, in one particular embodiment the graphic indicator is rendered in a green color when the computed load does not exceed the predetermined magnitude, and it is rendered in a red color when the computed load exceeds the predetermined magnitude.

Figure 3:
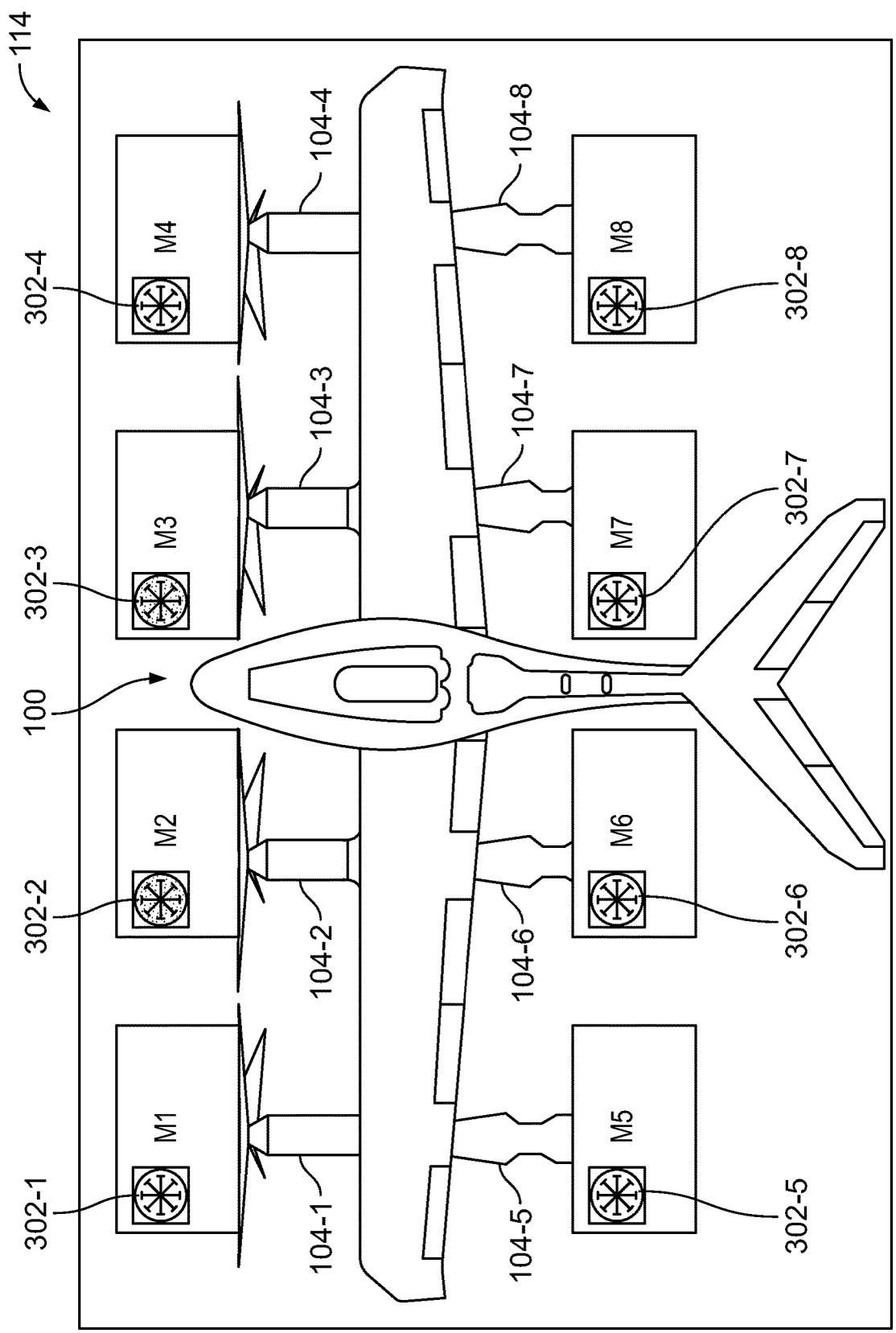
FIG. 3 depicts an image that may be rendered on a display device in the aircraft of FIG. 1.

It will be appreciated that the graphic indicator(s) may be variously rendered on the display device 114. For completeness, one example of how the graphic indicator(s) may be rendered on the display device 114 is depicted in FIG. 3. In FIG. 3, the display device 114 is commanded to render a top-down view of one embodiment of the aircraft 100. In the depicted embodiment, as was previously alluded to, the aircraft 100 includes eight rotors 104 disposed on the fuselage 102. A rotor graphic 302, as well as other graphics, is rendered adjacent to each rotor 104. The rotor graphics are each rendered in a first color (e.g., green) when the computed load does not exceed the predetermined magnitude, and each graphic is rendered in a second color (e.g., red)

when the computed load exceeds the predetermined magnitude. In the depicted display, the second and third rotor graphics 302-2, 302-3 are rendered in the second color, while the others are rendered in the first color. This indicates that the ice accretion detection system 124 determined that ice is accreting on the second and third rotors 104-2, 104-3. The pilot may if needed or desired, implement appropriate deicing actions.

In addition to commanding the display device 114 to render the graphic indicators, the processing system 126 may be further configured, in some embodiments, to determine (and display) the nearest landing station for the aircraft 100 when the computed load exceeds the predetermined magnitude. This will allow the pilot (onboard or remote) to take appropriate action, if needed, to land the aircraft 100 at the nearest landing station. When the aircraft 100 is configured as a VTOL aircraft, the pilot may also determine whether to perform a vertical or conventional landing.

In some embodiments, when there is no onboard or remote pilot, the processing system 126 supplies the computed load(s) and an alert the flight control computer 106, which in turn automatically takes appropriate actions. The actions taken by the flight control computer 106 may be based on the computed load(s), as well as various other extremal parameters, such as weather data, altitude, flight path, etc. Depending on the computed load(s), the flight control computer 106 may implement a conventional landing instead of vertical landing and may also alert the ground station. In some embodiments, the processing system 126 may also be configured to generate and supply an "ABORT" alert to the flight control computer 106 to avoid catastrophic failures and/or to abort the mission. In some embodiments, the computed load data is also supplied to maintenance personnel so that the affected rotors 104 may be inspected and/or maintained before the next takeoff.

Figure 4:
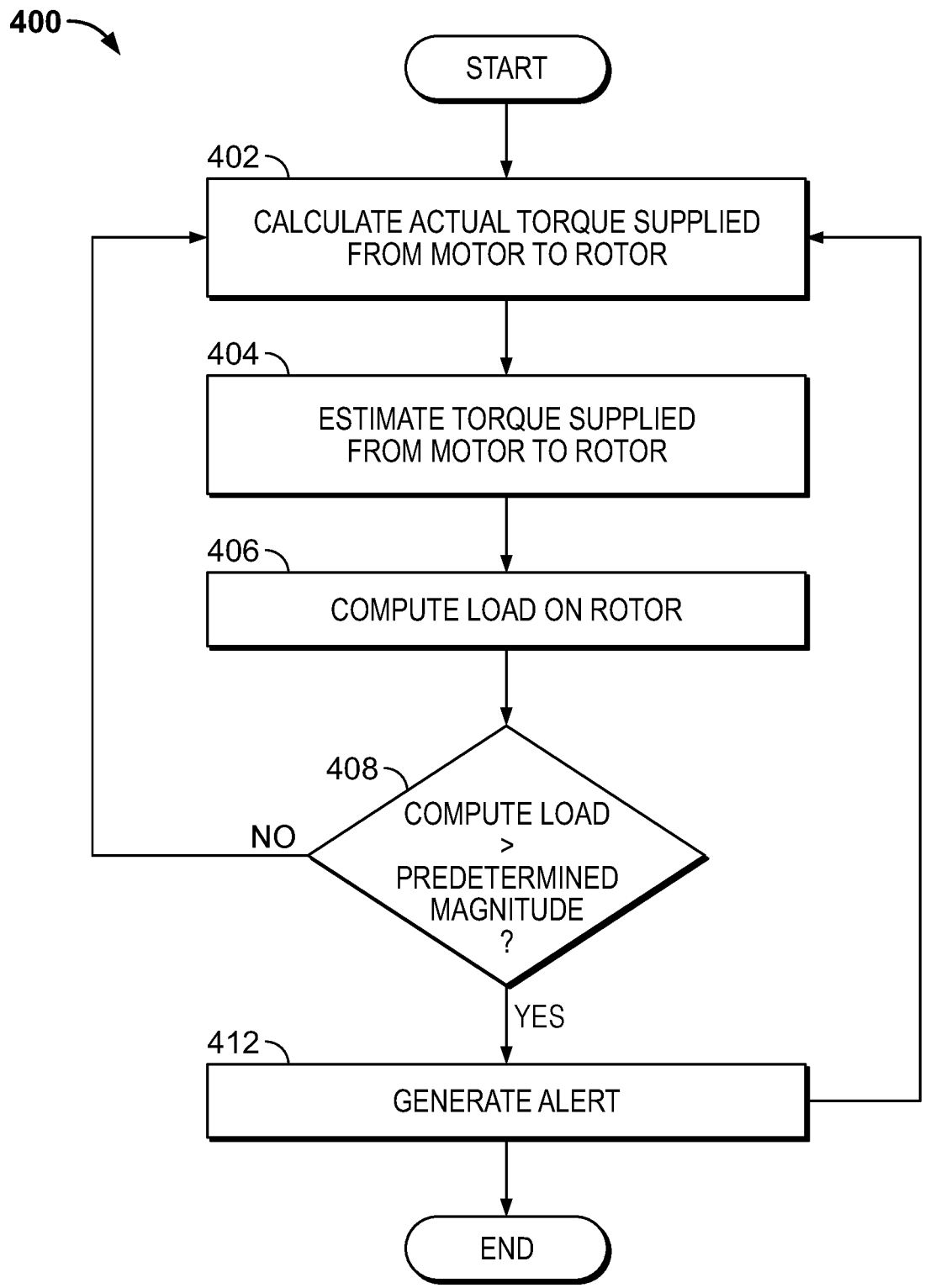
FIG. 4 depicts a process, in flowchart form, that may be implemented by the ice accretion detection system.

Referring now to FIG. 4, a process flowchart is depicted of one example process 400 for detecting ice accretion on a rotor 104 of an aircraft 100. The order of operation within the process 400 is not limited to the sequential execution as illustrated in the figure, but may be performed in one or more varying orders as applicable and in accordance with the present disclosure.

The example process 400, which may be implemented in the processing system 126, includes calculating the actual torque supplied from an electric motor 108 to the rotor 104 (402). The torque that should be supplied from the electric motor 108 to the rotor 104 is estimated using a model of the electric motor and the rotor (404). The load on the rotor 104 is computed from the actual torque and the estimated torque (406) and the computed load is compared to a predetermined magnitude (408). If the computed load does not exceed the predetermined magnitude, the process repeats. However, if the computed load does exceed the predetermined magnitude, an alert is generated that indicates ice is accreting on the rotor 104 (412), and the process repeats.

Although not depicted in FIG. 4, as was mentioned above, when the computed load exceeds the predetermined magnitude, the process 400 may also include, at least in some embodiments, determining (and displaying) the nearest landing station for the aircraft 100, and/or supplying the computed load(s) and an alert to the flight control computer 106, and/or generate and supply an "ABORT" alert to the flight control computer 106.

The system and method described herein detect ice accretion on aircraft rotors, and most notably on UAM/UAV aircraft rotors, to thereby enable suitable deicing operations or provide crew indications of icing and do so with negligible or no increase in electric energy consumption, cost, and weight.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may for instance, comprise one or more physical or logical modules of computer instructions that may for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for detecting ice accretion on a rotor of an aircraft, the system comprising a processing system that is configured to:
    receive torque data indicative of actual torque supplied from an electric motor to the rotor;
    implement a model of the electric motor and the rotor that determines an estimated torque that should be supplied from the electric motor to the rotor;
    compute a load on the rotor from the actual torque and the estimated torque;
    compare the computed load to a predetermined magnitude; and
    when the computed load exceeds the predetermined magnitude, generate an alert that indicates ice is accreting on the rotor,
    wherein the model implemented in the processing system estimates the torque that should be supplied to the aircraft rotor from:
        RPM command data, the RPM command data indicative of a rotational speed at which the aircraft rotor is being commanded to rotate;
        angular rate data, the angular rate data indicative of angular rates of the aircraft;
        air density data, the air density data indicative of air density; and wind estimate data, the wind estimate data indicative of estimated relative wind velocities in three orthogonal axes.

2. The system of claim 1, further comprising:
a display device in operable communication with the processing system,
wherein:
the processing system is further configured to command the display device to render a graphic indicator associated with the rotor; and
the alert causes the graphic indicator to change color.

3. The system of claim 2, wherein:
the graphic indicator is rendered in a green color when the computed load does not exceed the predetermined magnitude; and
the graphic indicator is rendered in a red color when the computed load exceeds the predetermined magnitude.

4. The system of claim 1, wherein the processing system is further configured to determine a nearest landing station for the aircraft when the computed load exceeds the predetermined magnitude.

5. The system of claim 1, wherein:
the processing system is further configured to supply estimated load data indicative of the estimated load, when the computed load exceeds the predetermined magnitude; and
the system further comprises an onboard aircraft flight control computer coupled to receive the estimated load data from the processing system and configured to process the estimated load data to compute appropriate mitigating actions based on the estimated load.

6. The system of claim 1, further comprising:
a motor controller in operable communication with the electric motor and the processing system, the motor controller coupled to receive the RPM command data and, upon receipt thereof, to (i) command the electric motor to rotate at the commanded RPM and (ii) supply the RPM command data to the processing system.

7. The system of claim 1, further comprising an inertial data source in operable communication with the processing system, the inertial data source configured to supply the inertial data.

8. The system of claim 1, further comprising an air data source in operable communication with the processing system, the airs data source configured to supply the air density data.

9. The system of claim 1, wherein:
the processing system is further configured to implement a wind estimator model; and
the wind estimator model supplies the wind estimate data from:
the angular rate data;
the air density data;
total pressure data, the total pressure data indicative of sensed aircraft total pressure;
angle-of-attack (AoA) data, the AoA data indicative of sensed aircraft AoA;
body axis acceleration data, the body axis acceleration data indicative of accelerations of the aircraft in three orthogonal axes; and
ground-based velocity data, the ground-based velocity data indicative of ground-based velocities of the aircraft in three orthogonal axes.

10. A method for detecting ice accretion on a rotor of an aircraft, the method comprising the steps of:
calculating, in a processor, actual torque supplied from an electric motor to the rotor;
estimating torque that should be supplied from the electric motor to the rotor using a model of the electric motor and the rotor that is implemented in the processor;
computing, in the processor, a load on the rotor from the actual torque and the estimated torque;
comparing the computed load to a predetermined magnitude in the processor; and
when the computed load exceeds the predetermined magnitude, generating, using the processor, an alert that indicates ice is accreting on the rotor,
wherein the model implemented in the processor estimates the torque that should be supplied to the aircraft rotor from:
RPM command data, the RPM command data indicative of a rotational speed at which the aircraft rotor is being commanded to rotate;
inertial data, the inertial data indicative of angular rates of the aircraft; and
wind data, the wind data indicative of relative wind velocities in three orthogonal axes.

11. The method of claim 10, wherein the alert causes a graphic indicator associated with the rotor, and rendered on a display device, to change color.

12. The method of claim 11, wherein:
the graphic indicator is rendered in a green color when the computed load does not exceed the predetermined magnitude; and
the graphic indicator is rendered in a red color when the computed load exceeds the predetermined magnitude.

13. The method of claim 10, further comprising:
determining, in the processor, a nearest landing station for the aircraft when the computed load exceeds the predetermined magnitude.

14. The method of claim 10, further comprising:
supplying the estimated load from the processor to an onboard aircraft flight control computer when the computed load exceeds the predetermined magnitude; and
computing, in the onboard aircraft flight control computer, appropriate mitigating actions based on the estimated load.

15. An aircraft comprising:
a fuselage;
a plurality of rotors disposed on the fuselage, each rotor coupled to receive a drive torque;
a plurality of motors, each motor coupled to, and configured to supply the drive torque to, a different one of the rotors; and
an ice accretion detection system comprising a processing system that is configured to:
receive torque data indicative of actual torque supplied from each electric motor to its associated rotor;
implement models of each electric motor and rotor combination, wherein each model determines an estimated torque that should be supplied from each electric motor to its associated rotor;
compute a load on each rotor from the actual torque and the estimated torque;
compare each of the computed loads to a predetermined magnitude; and
when one or more of the computed loads exceeds the predetermined magnitude, generate an alert that indicates ice is accreting on the associated rotor,
wherein the each model estimates the torque that should be supplied to the each electric motor to is associated rotor from:

RPM command data, the RPM command data indicative of a rotational speed at which the rotor is being commanded to rotate;

inertial data, the inertial data indicative of angular rates of the aircraft; and wind data, the wind data indicative of relative wind velocities in three orthogonal axes.

16. The aircraft of claim 15, further comprising:

a display device in operable communication with the processing system, wherein:

the processing system is further configured to command the display device to render a graphic indicator associated with the rotor; and the alert causes the graphic indicator to change color.

17. The aircraft of claim 15, wherein the processing system is further configured to determine a nearest landing station for the aircraft when the computed load exceeds the predetermined magnitude.

18. The aircraft of claim 15, further comprising:

a flight control computer disposed within the fuselage and in operable communication with the processing system, wherein:

the processing system is further configured to supply estimated load data indicative of the estimated load to the flight control computer, when the computed load exceeds the predetermined magnitude, and the flight control computer is configured to process the estimated load data to compute appropriate mitigating actions based on the estimated load.

* * * * *